United States Patent
Yeh et al.

(10) Patent No.: US 9,020,355 B2
(45) Date of Patent: Apr. 28, 2015

(54) VLC MODULATION SYSTEM AND METHOD THEREOF

(71) Applicant: Industrial Technology Research Institute, Hsinchu (TW)

(72) Inventors: Chien Hung Yeh, Hsinchu (TW); Chi Wai Chow, Hsinchu (TW); Yu Feng Liu, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 148 days.

(21) Appl. No.: 13/718,048

(22) Filed: Dec. 18, 2012

(65) Prior Publication Data
US 2014/0056589 A1    Feb. 27, 2014

(30) Foreign Application Priority Data
Aug. 23, 2012    (TW) .............................. 101130582 A

(51) Int. Cl.
*H04B 10/11* (2013.01)
*H04B 10/116* (2013.01)
*H04B 10/50* (2013.01)

(52) U.S. Cl.
CPC .............. *H04B 10/11* (2013.01); *H04B 10/501* (2013.01); *H04B 10/116* (2013.01)

(58) Field of Classification Search
USPC ........... 398/93, 103, 118–131, 140, 182–201; 372/38.1–38.09
See application file for complete search history.

(56) References Cited

U.S. PATENT DOCUMENTS

| | | | |
|---|---|---|---|
| 7,173,551 B2 | 2/2007 | Vrazel et al. | |
| 7,912,377 B2 | 3/2011 | Koga | |
| 8,620,163 B1 * | 12/2013 | Sleator | 398/118 |
| 2003/0194241 A1 * | 10/2003 | Farmer | 398/167.5 |
| 2008/0310850 A1 | 12/2008 | Pederson et al. | |
| 2009/0284366 A1 | 11/2009 | Haartsen et al. | |
| 2010/0135671 A1 * | 6/2010 | Park et al. | 398/172 |
| 2010/0135673 A1 | 6/2010 | Son et al. | |
| 2011/0200338 A1 | 8/2011 | Yokoi | |
| 2012/0148262 A1 * | 6/2012 | Awadalla et al. | 398/193 |

FOREIGN PATENT DOCUMENTS

WO    2011102662    8/2011

OTHER PUBLICATIONS

J. Vucic et al., "Implementation of a Real-Time DMT-based 100 Mbit/s Visible-Light Link", Proc. ECOC, 2010, We.7.B.1.
Jelena Vucic et al. "513 Mbit/s Visible Light Communications Link Based on DMT-Modulation of a White LED", Journal of Lightwave Technology, Dec. 15, 2010, pp. 3512-3518, vol. 24.
Hoa Le Minh et al. "High-Speed Visible Light Communications Using Multiple-Resonant Equalization", IEEE Photon. Technol. Lett., 2008 pp. 1243-1245, vol. 20.
Office Action issued on Dec. 25, 2014 for the Taiwanese counterpart application 101130582.

* cited by examiner

*Primary Examiner* — David Payne
*Assistant Examiner* — Casey Kretzer
(74) *Attorney, Agent, or Firm* — WPAT, P.C.; Anthony King; Kay Yang

(57) ABSTRACT

A VLC (Visible Light Communication) modulation system and method thereof, which includes a visible light generating device and a visible light receiving device. The visible light generating device includes a visible light emitting module and an arbitrary waveform generator. The arbitrary waveform generator further includes a first finite impulse response filtering unit, a pre-distortion amount control unit, and a second finite impulse response filtering unit.

20 Claims, 5 Drawing Sheets

US 9,020,355 B2

VLC MODULATION SYSTEM AND METHOD THEREOF

TECHNICAL FIELD

The current disclosure relates to a visible light communication modulation system and method thereof.

BACKGROUND

The visible light generated by LEDs has certain advantages compared to visible light generated from other sources. Such advantages include high information security, a high signal noise ratio, none-interference from electronic magnetic frequencies, and being free of frequency allocation. Consequently, LEDs can be effectively utilized in fields of visible light communication and illumination.

Moreover, the high modulation speed of high-brightness LEDs has a bandwidth around 1 MHz. Therefore, the high-brightness LEDs may be utilized within visible light networks. Furthermore, RGB LEDs, or the combination of blue LEDs and phosphor are a few ways of attaining high-brightness LEDs.

However, due to phosphor's limited relaxation time, the modulation speed is limited to 1 MHz and the maximum data rate is 1 Mb/s. Additionally, the combination of blue LEDs and phosphor may not be implemented within indoor visible light signal transmissions.

SUMMARY

In accordance with one embodiment of the current disclosure, a visible light communication (VLC) modulation system comprises a visible light signal generating device and a visible light signal receiving device, wherein the visible light signal generating device may be configured to generate a visible light signal and the visible light signal receiving device may be configured to receive the visible light signal.

Furthermore, the visible light signal generating device comprises a visible light illuminating module having an adaptive filter, and an arbitrary waveform generator, wherein the arbitrary waveform generator may be configured to couple to the visible light illuminating module and generate a amplitude-shift keying (ASK) waveform. The arbitrary waveform generator further comprises a first finite impulse response filtering unit and a pre-distortion amount control unit and a second finite impulse response filtering unit.

The first finite impulse response filtering unit may be configured to generate a first impulse signal to a first convolution unit. The pre-distortion amount control unit is configured to generate a short impulse signal, wherein the pre-distortion amount control unit has a memory and a pre-determined parameter is stored in the memory. The second finite impulse response filtering unit is configured to generate a second impulse signal, wherein a duty cycle of the second impulse signal is half of a duty cycle of the first impulse signal.

In accordance with one embodiment of the current disclosure, a method of VLC modulation, the steps of the method comprise: generating a first impulse signal and convoluting the first impulse signal; generating a symbol delay signal according to a up-sampling signal, wherein the symbol delay signal includes a delay symbol; generating a first scaling signal for scaling a short impulse signal; generating a second impulse signal according to the scaled short impulse signal, wherein a duty cycle of the second impulse signal is a half of a duty cycle of the first impulse signal; generating a visible light signal according to the fourth impulse signal; and receiving the visible light signal.

In order to provide further understanding of the techniques, means, and effects of the current disclosure, the following detailed description and drawings are hereby presented, such that the purposes, features and aspects of the current disclosure may be thoroughly and concretely appreciated; however, the drawings are provided solely for reference and illustration, without any intention to be used for limiting the current disclosure.

BRIEF DESCRIPTION OF THE DRAWINGS

The objectives and advantages of the current disclosure are illustrated with the following description and upon reference to the accompanying drawings in which.

DETAILED DESCRIPTION

The current disclosure provides a visible light communication (VLC) modulation system and method thereof.

Figure 1:
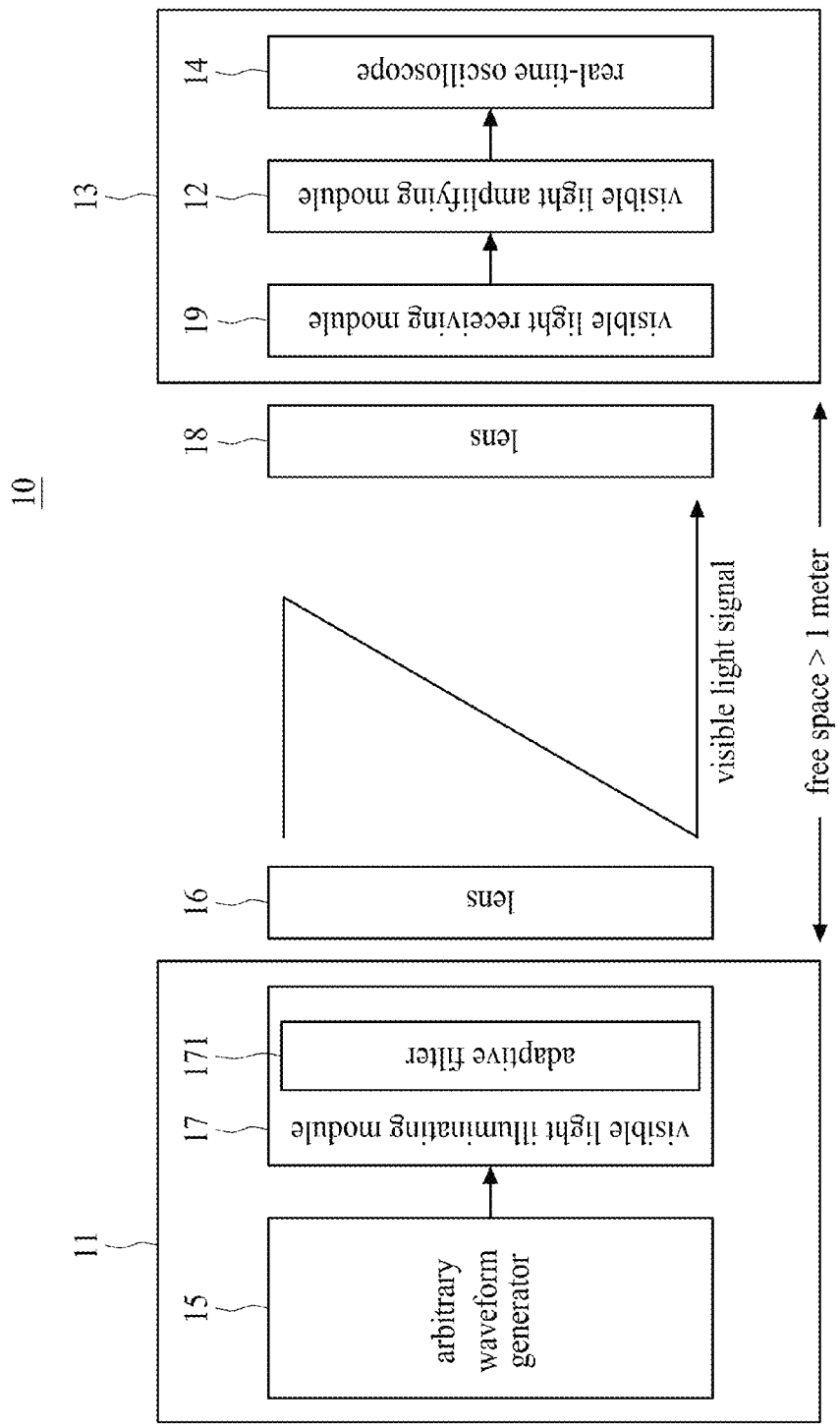
FIG. 1 is a schematic view of one embodiment of the current disclosure showing a function block diagram of a VLC modulation system.

FIG. 1 is a schematic view of one embodiment of the current disclosure showing a function block diagram of a VLC modulation system 10.

In one embodiment of the current disclosure, the VLC modulation system 10 includes a visible light signal generating device 11 and a visible light signal receiving device 13. The VLC modulation system 10 further includes a pair of lenses 16 and 18, which are respectively coupled to the visible light signal generating device 11 and the visible light signal receiving device 13. The pair of lenses 16 and 18 are configured to extend a transmission distance of the visible light signal. The visible light signal generating device 11 may be configured to generate a visible light signal, wherein the visible light signal has a 20 Mb/s transmission rate and a bit-error-rate. The bit-error-rate may be less than $10^{-10}$ bits.

The visible light receiving device 13 is configured to receive the visible light signal. As shown in FIG. 1, the visible light generating device 11 includes an arbitrary waveform generator 15 which is configured to couple to the visible light illuminating module 17. The arbitrary waveform generator may have a maximum operating rate of 20 MHz and a bit-error-rate that is less than $10^{-10}$ bits.

Moreover, the visible light signal receiving device 13 may be configured to receive the visible light signal. As shown in FIG. 1, the visible light signal generating device 11 may include an arbitrary waveform generator 15. The arbitrary waveform generator 15 may be configured to couple to a visible light illuminating module 17.

The arbitrary waveform generator 15 may have a maximum operating rate of 20 MHz. The visible light illuminating module 17 may include a white LED, wherein the white LED has a 100 lm output and is driven by a 350 mA current.

The visible light receiving device 13 may include a visible light receiving module 19, a visible light amplifying module 12 and a real-time oscilloscope 14, wherein the visible light receiving module 19 may include a Si-based PIN receiving unit.

The visible light amplifying module 12 may include a broadband coaxial amplifier, wherein the Si-based PIN receiving unit may have a detection wavelength range of 350 nm to 1100 nm, a 0.65 Ampere/Watt responsivity, a 13 mm$^2$ working area, a 17 MHz bandwidth and a 530 µV noise root mean square value.

Figure 2:
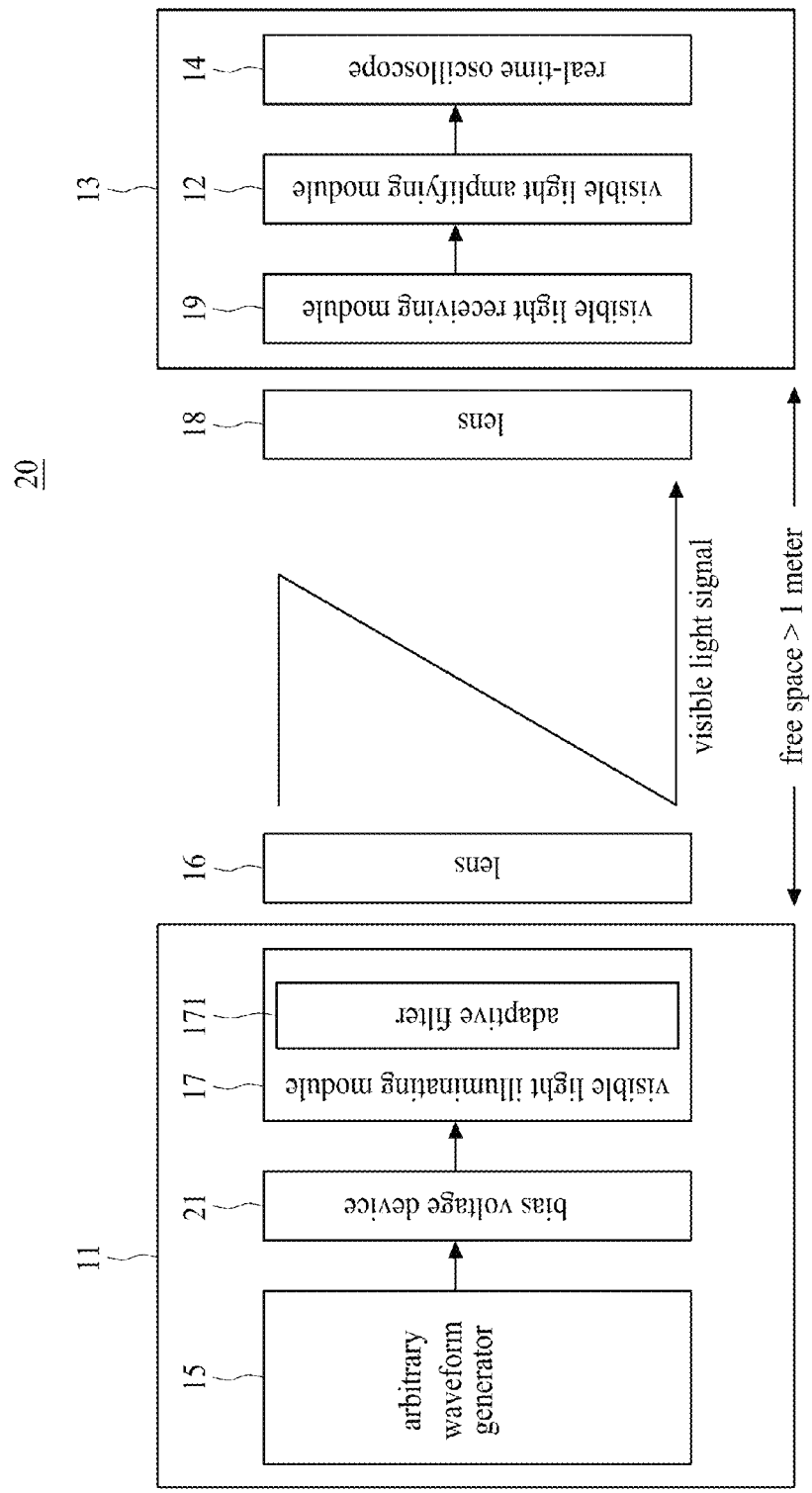
FIG. 2 is a schematic view of a block diagram of one embodiment of the present disclosure showing a VLC modulation system.

FIG. 2 is a schematic view of a block diagram of one embodiment of the present disclosure showing a VLC modulation system 20. Compared with FIG. 1, the arbitrary waveform generator 15 may be configured to couple to the visible light illuminating module 17 via a bias voltage device 21.

Figure 3:
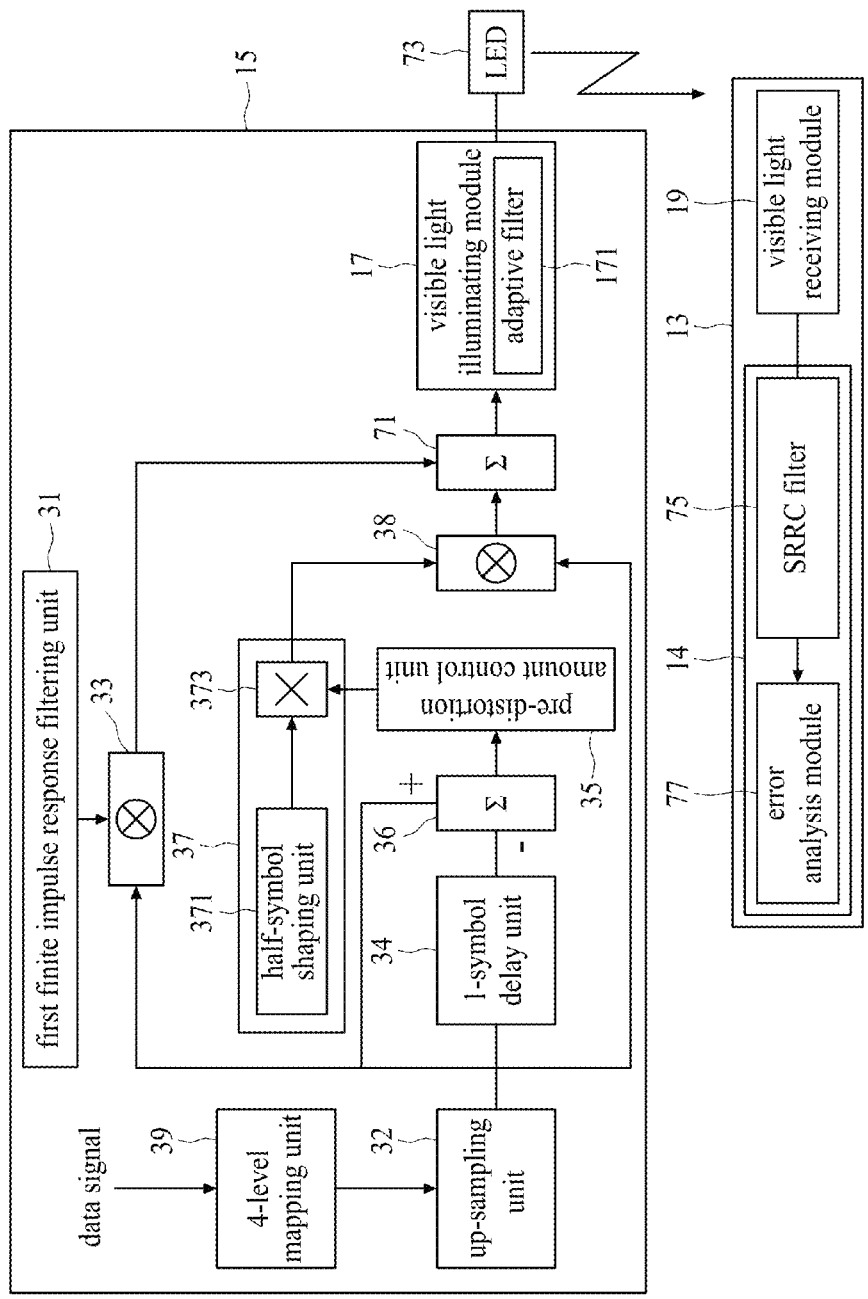
FIG. 3 is a schematic view of a block diagram of one embodiment of the present disclosure showing a VLC modulation system.

FIG. 3 is a schematic view of a block diagram of one embodiment of the present disclosure showing a VLC modulation system 10.

As shown in FIG. 3, the arbitrary waveform generator 15 may include a first finite impulse response filtering unit 31, a first convolution unit 33, a pre-distortion amount control unit 35, a 4-level mapping unit 39, an up-sampling unit 32, a 1-symbol delay unit 34, a first adder-subtractor 36, a second convolution unit 38, a second adder-subtractor 71 and a visible light illuminating module 17, wherein the visible light illuminating module 17 may includes an adaptive filter 171.

The first finite impulse response filtering unit 31 is configured to generate a first impulse signal P1 to the first convolution unit 33. The pre-distortion amount control unit 35 may have a memory for storing a pre-determined parameter, wherein the pre-determined parameter is in a range of 2 to 3.

The pre-distortion amount control unit 35 may be configured to generate a short impulse signal to a second finite impulse response filtering unit 37. The second finite impulse response filtering unit 37 may include a half-symbol shaping unit 371 and a multiplier 373, wherein the multiplier 373 may be configured to amplify an impulse signal from the half-symbol shaping unit 371 and the short impulse signal to generate a second impulse signal P2, wherein a duty cycle of the second impulse P2 signal is half of a duty cycle of the first impulse signal P1.

The 4-level mapping unit 39 may be configured to generate a 4-level ASK signal, according to a data signal, to an up-sampling unit 32. The up-sampling unit 32 may be configured to generate a sampled symbol signal to a 1-symbol delay unit 34, a first digital adder-subtractor 36, the first convolution unit 33 and the second convolution unit 38. The 1-symbol delay unit 34 may generate a delay symbol signal to the first digital adder-subtractor 36.

The first digital adder-subtractor 36 may generate a first scaling signal to the pre-distortion amount control unit 35. The second convolution unit 38 may generate a third impulse signal to the second digital adder-subtractor 71. The second digital adder-subtractor 71 may generate a fourth impulse signal to the adaptive filter 171 and the visible light signal may be generated by the white LED 73 to the visible light receiving device 13.

As shown in FIG. 3, the visible light received by the visible light receiving module 19 of the visible light receiving device 13 may be transmitted to the real-time oscilloscope 14 via the visible light amplifying module 12. The real-time oscilloscope 14 further includes a square root raised cosine (SRRC) filter 75 and an error analysis module 77, wherein a roll-off factor of the square root raised cosine filter 75 may be 0.25.

The error analysis module 77 may be configured to analyze the bit-error-rate of the visible light signal.

Figure 4:
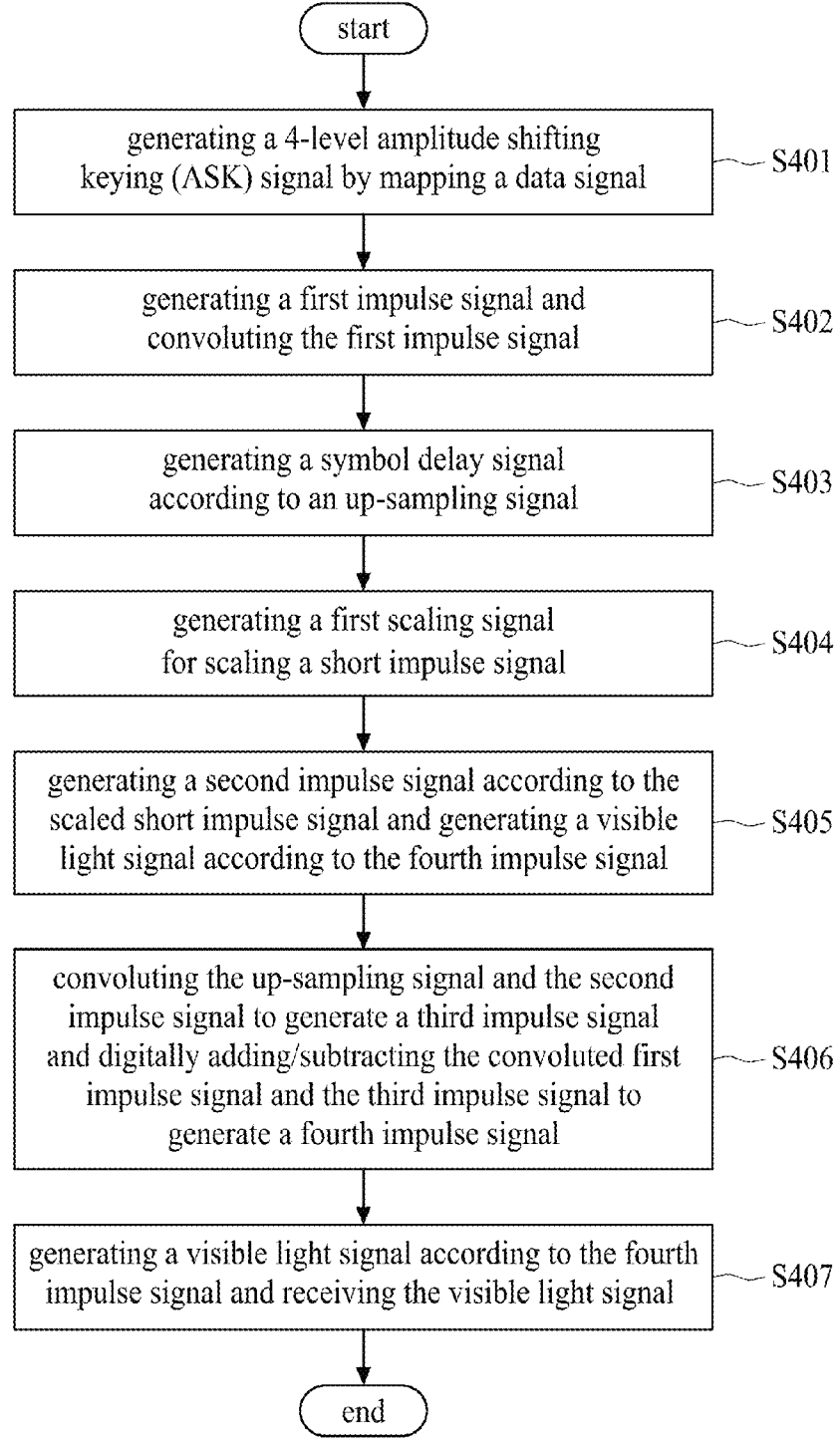
FIG. 4 is a flow diagram of one embodiment of the current disclosure showing a VLC modulation method.

FIG. 4 is a flow diagram of one embodiment of the current disclosure showing a VLC modulation method. In step S401, a data signal may be mapped to generate a 4-level ASK signal, wherein the data signal may include a pseudo-random binary sequence (PRBS).

In step S402, a first impulse signal is generated and the first impulse signal is convoluted. In step S403, an up-sampling signal is generated upon the 4-level ASK signal and a symbol delay signal may be generated upon the up-sampling signal, wherein the symbol delay signal may have a delay symbol.

In step S404, a first scaling signal may be generated upon the symbol delay signal. In step S405, a second impulse signal may be generated upon the scaled short impulse signal and the visible light signal may be generated upon the fourth impulse signal, wherein a duty cycle of the second impulse signal is a half of a duty cycle of the first impulse signal.

In step S406, a third impulse signal may be generated by convoluting the up-sampling signal and the second impulse signal and a fourth impulse signal may be generated by digitally adding/subtracting the convoluted first impulse signal and the third impulse signal. In step S407, a visible light signal may be generated upon the fourth impulse signal and the visible light signal may be received by the visible light receiving device, wherein the visible light signal may have a 20 Mb/s transmitting rate.

Figure 5:
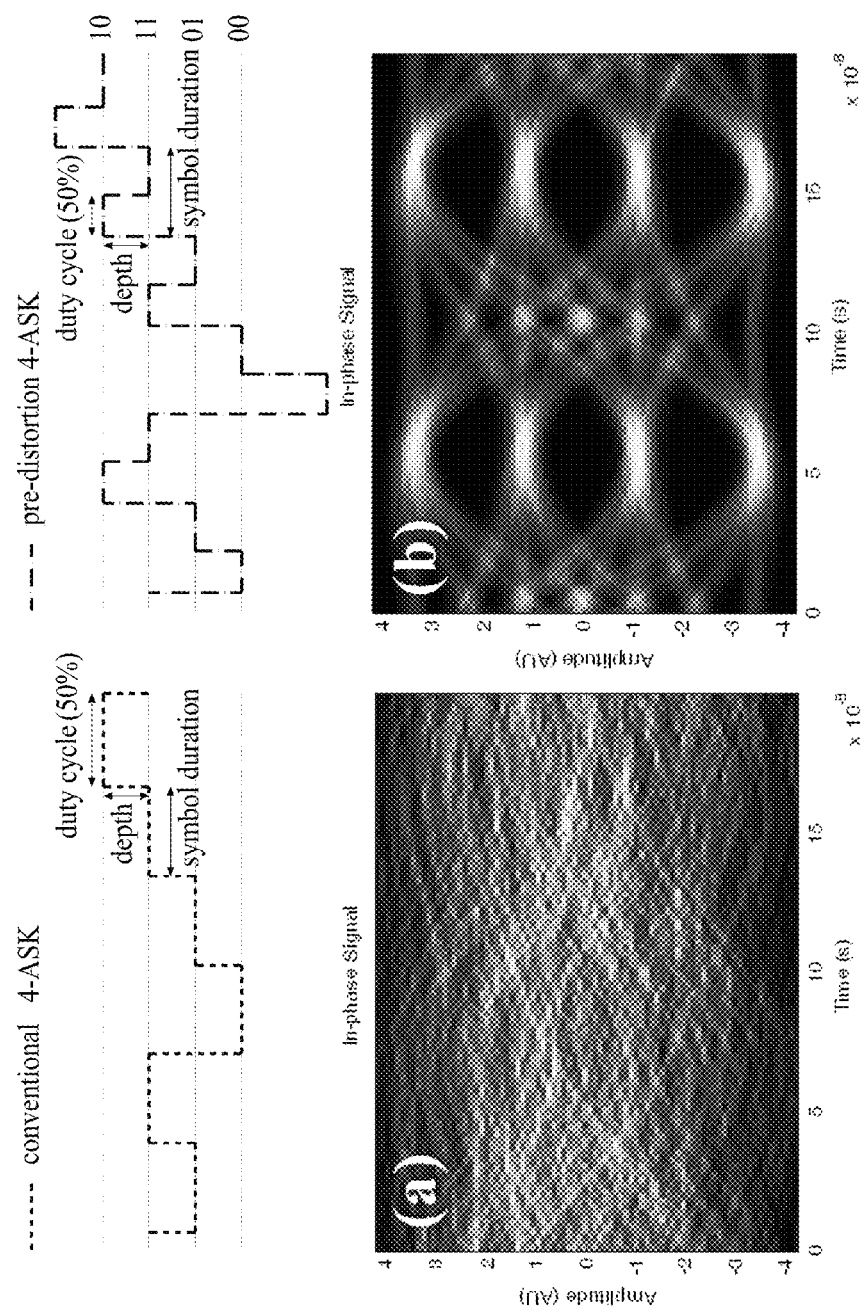
FIG. 5 is a schematic view of an eye diagram and a phase of a wave comparison diagram of pre-distortion 4-level ASK signals and conventional 4-level ASK signals of one embodiment of the current disclosure.

FIG. 5 is a schematic view of an eye diagram and a phase of a wave comparison diagram of pre-distortion 4-level ASK signals and conventional 4-level ASK signals of one embodiment of the current disclosure. The eye diagram of the conventional 4-level ASK signals is shown in the bottom left of FIG. 5 and the eye diagram of the pre-distortion 4-level ASK signals is shown in the bottom right of FIG. 5.

Although the current disclosure and its objectives have been described in detail, it should be understood that various changes, substitutions and alterations can be made herein without departing from the spirit and scope of the invention as defined by the appended claims. For example, many of the processes discussed above can be implemented using different methodologies, replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the current disclosure, processes, machines, manufacture, compositions of matter, means, methods, or steps, presently existing or later to be developed, that perform substantially the same function or achieve substantially the same result as the corresponding embodiments described herein may be utilized according to the current disclosure. Accordingly, the appended claims are intended to include within their scope such processes, machines, manufacture, compositions of matter, means, methods, or steps.

What is claimed is:

1. A visible light communication (VLC) modulation system, comprising:
   a visible light signal generating device configured to generate a visible light signal, which comprises:
   a visible light illuminating module having an adaptive filter; and
   an arbitrary waveform generator configured to couple to the visible light illuminating module and generate a amplitude-shift keying (ASK) waveform, wherein the arbitrary waveform generator further comprises:

a first finite impulse response filtering unit configured to output a first impulse signal to a first convolution unit;

a pre-distortion amount control unit configured to output a short impulse signal, wherein the pre-distortion amount control unit has a memory and a pre-determined parameter is stored in the memory;

a second finite impulse response filtering unit configured to generate a second impulse signal, wherein a duty cycle of the second impulse signal is half of a duty cycle of the first impulse signal;

and a visible light signal receiving device configured to receive the visible light signal.

2. The VLC modulation system of claim 1, wherein the arbitrary waveform generator further comprises:

a 4-level mapping unit configured to generate a 4-level ASK signal, according to a data signal, to an up-sampling unit, wherein the up-sampling unit is configured to generate a sampled symbol signal to a 1-symbol delay unit, a first digital adder-subtractor, the first convolution unit and a second convolution unit; and a second adder-subtractor;

wherein the 1-symbol delay unit generates a delay symbol signal to the first digital adder-subtractor, in which the first digital adder-subtractor generates a first scaling signal to the pre-distortion amount control unit, the second convolution unit generates a third impulse signal according to the sampled symbol signal and the second impulse signal; and wherein the second digital adder-subtractor generates a fourth impulse signal to the adaptive filter.

3. The VLC modulation system of claim 2, wherein the data signal comprises a pseudo-random binary sequence (PRBS).

4. The VLC modulation system of claim 1, wherein the second finite impulse response filtering unit further comprises a half-symbol shaping unit and a multiplier, wherein the multiplier is configured to amplify an impulse signal from the half-symbol shaping unit.

5. The VLC modulation system of claim 1, wherein the visible illuminating module comprises a white LED, wherein the white LED has a 100 lm output and is driven by a 350 mA current.

6. The VLC modulation system of claim 1, wherein the VLC modulation system further comprises a pair of lenses configured to respectively couple to the visible light generating device and the visible light receiving device, wherein the pair of lenses are configured to extend a transmission distance of the visible light signal.

7. The VLC modulation system of claim 1, wherein the arbitrary waveform generator is configured to couple to the visible light illuminating module via a bias voltage device.

8. The VLC modulation system of claim 1, wherein the visible light signal receiving device further comprises:

a visible light receiving module;

a visible light amplifying module configured to couple to the visible light receiving module; and a real-time oscilloscope configured to couple to the visible light amplifying module.

9. The VLC modulation system of claim 8, wherein the visible light receiving module comprises a Si-based PIN receiving unit.

10. The VLC modulation system of claim 9, wherein the Si-based PIN receiving module has a detection wavelength range of 350 nm to 1100 nm, a 0.65 Ampere/Watt responsivity, a 13 mm$^2$ working area, a 17 MHz bandwidth and a 530 µV noise root mean square value.

11. The VLC modulation system of claim 8, wherein the visible light amplifying module comprises a broadband coaxial amplifier.

12. The VLC modulation system of claim 8, wherein the real-time oscilloscope further comprises a square root raised cosine (SRRC) filter and an error analysis module, wherein the error analysis module is configured to analyze the bit-error-rate of the visible light signal.

13. The VLC modulation system of claim 8, wherein a roll-off factor of the square root raised cosine filter is 0.25.

14. The VLC modulation system of claim 8, wherein the bit-error rate of the visible light signal is less than $10^{-10}$ bits.

15. The VLC modulation system of claim 1, wherein the visible light signal has a 20 Mb/s transmission rate.

16. The VLC modulation system of claim 1, wherein the visible light generating device and the visible light receiving device are at a distance apart, wherein the distance is longer than one meter.

17. A method of VLC modulation, wherein the steps of the method comprise of:

generating a first impulse signal and convoluting the first impulse signal;

generating a symbol delay signal according to an up-sampling signal, wherein the symbol delay signal includes a delay symbol;

generating a first scaling signal for scaling a short impulse signal;

generating a second impulse signal according to the scaled short impulse signal, wherein a duty cycle of the second impulse signal is a half of a duty cycle of the first impulse signal;

convoluting the up-sampling signal and the second impulse signal to generate a third impulse signal;

digitally adding/subtracting the convoluted first impulse signal and the third impulse signal to generate a fourth impulse signal;

generating a visible light signal according to the fourth impulse signal;

generating a 4-level amplitude shifting keying (ASK) signal by mapping a data signal;

and receiving the visible light signal.

18. The method of claim 17, wherein the data signal comprises a pseudo-random binary sequence (PRBS).

19. The method of claim 17 further comprises a step of generating the up-sampling signal according to the 4-level ASK signal.

20. The method of claim 17, wherein the visible light signal has a transmission rate of 20 Mb/s.

* * * * *